United States Patent [19]

Orzel et al.

[11] Patent Number: 5,381,656
[45] Date of Patent: Jan. 17, 1995

[54] ENGINE AIR/FUEL CONTROL SYSTEM WITH CATALYTIC CONVERTER MONITORING

[75] Inventors: Daniel V. Orzel, Westland; Glenn A. Zimlich, Dearborn Heights; Tri T. Truong, Inkster, all of Mich.

[73] Assignee: Ford Motor Company, Dearborn, Mich.

[21] Appl. No.: 127,153

[22] Filed: Sep. 27, 1993

[51] Int. Cl.⁶ ............................................. F01N 3/20
[52] U.S. Cl. .................................... 60/274; 60/276; 60/285; 123/674; 123/703
[58] Field of Search ................. 60/274, 276, 285, 277; 123/672, 674, 703

[56] References Cited

U.S. PATENT DOCUMENTS

| | | |
|---|---|---|
| 3,939,654 | 2/1976 | Creps . |
| 4,130,095 | 12/1978 | Bowler ................................ 60/276 |
| 4,304,204 | 12/1981 | Glockler et al. . |
| 4,526,147 | 7/1985 | Grob . |
| 4,831,838 | 5/1989 | Nagai .................................. 60/274 |
| 5,115,639 | 5/1992 | Gopp .................................. 60/274 |
| 5,207,056 | 5/1993 | Benninger . |
| 5,224,345 | 7/1993 | Schnaibel et al. . |
| 5,251,437 | 10/1993 | Furuya . |
| 5,255,512 | 10/1993 | Hamburg et al. . |
| 5,255,515 | 10/1993 | Blumenstock et al. . |
| 5,289,678 | 3/1994 | Grutter . |

*Primary Examiner*—Ira S. Lazarus
*Assistant Examiner*—Daniel J. O'Connor
*Attorney, Agent, or Firm*—Allan J. Lippa; Roger L. May

[57] ABSTRACT

A control system which controls engine air/fuel ratio and provides a measurement of efficiency in the catalytic converter coupled to the engine exhaust. Fuel delivered to the engine is adjusted by a feedback variable which is generated by integrating an output of an upstream exhaust gas oxygen sensor and trimmed by the output of a downstream exhaust gas oxygen sensor. For each cycle of the feedback variable, peak amplitude of the downstream sensor output is determined and squared. Similarly, the peak amplitude of the feedback variable for each of its cycles is squared. An indicating ratio of the square of the sum of the squares derived from the downstream sensor to the square of the sum of the squares derived from the feedback variable indicates converter efficiency.

11 Claims, 5 Drawing Sheets

ENGINE AIR/FUEL CONTROL SYSTEM WITH CATALYTIC CONVERTER MONITORING

FIELD OF THE INVENTION

The invention relates to controlling engine air/fuel ratio while concurrently monitoring the efficiency of a catalytic converter coupled to the engine's exhaust.

BACKGROUND OF THE INVENTION

It is known to concurrently provide feedback air/fuel control and monitor catalytic converter efficiency in response to exhaust gas oxygen sensors positioned upstream and downstream of the converter. In one known approach, converter degradation is indicated when a ratio of downstream to upstream sensor amplitude exceeds a reference value during a predetermined time period.

The inventors herein have recognized numerous problems with prior approaches. For example, variations in an operators driving habits over the predetermined time period may result in variation of test results and erroneous failure indications. An additional problem recognized by the inventors is that the sensor output amplitude may be clipped during transient air/fuel operation resulting in erroneous test indications. Further, the peak-to-peak sensor output may remain substantially unchanged with degradation in converter efficiency even though the amplitude in a rich or lean indicating direction may become degraded.

SUMMARY OF THE INVENTION

An object of the invention herein is to provide monitoring of catalytic converter efficiency during engine air/fuel control with less variability in the monitoring results than heretofore possible.

The object is achieved, and problems of prior approaches overcome, by providing both a control system and method for controlling engine air/fuel ratio and concurrently monitoring efficiency of a catalytic converter positioned in the engine exhaust. In one particular aspect of the invention, the method comprises the steps of: generating a feedback variable by integrating an output of an upstream exhaust gas oxygen sensor positioned upstream of the catalytic converter and trimming the integration by a signal derived from an output of a downstream exhaust gas oxygen sensor positioned downstream of the catalytic converter, the feedback variable cycling above and below a nominal value; adjusting fuel delivered to the engine by the feedback variable; determining and squaring both peak amplitude of the downstream exhaust gas oxygen sensor output and the feedback variable during each cycle of the feedback variable; providing a test period; summing each of the squared peak amplitude downstream sensor outputs and summing each of the squared peak amplitude feedback variables over the test period to provide respective first and second sums; and indicating degraded converter efficiency when a ratio of a square root of the second sum to a square root of the first sum exceeds a reference ratio.

Preferably the above cited method includes a step of providing the test period by determining when the engine has completed operation within each of a plurality of inducted airflow ranges for at least a minimum duration in each of said airflow ranges. Preferably, the minimum duration comprises a preselected number of cycles of the feedback variable.

An advantage of the above aspect of the invention is that accurate converter efficiency indications are provided even when the sensor output is clipped and even when the sensor output is asymmetrical. An additional advantage is that accurate efficiency indications are provided while maintaining engine air/fuel control despite variations in an operator's driving habits. Still another advantage is that the converter is tested over the engine's full operating range.

BRIEF DESCRIPTION OF THE DRAWINGS

The object and advantages of the invention will be more clearly understood by reading an example of an embodiment in which the invention is used to advantage with reference to the attached drawings wherein.

DESCRIPTION OF AN EMBODIMENT

Figure 1:
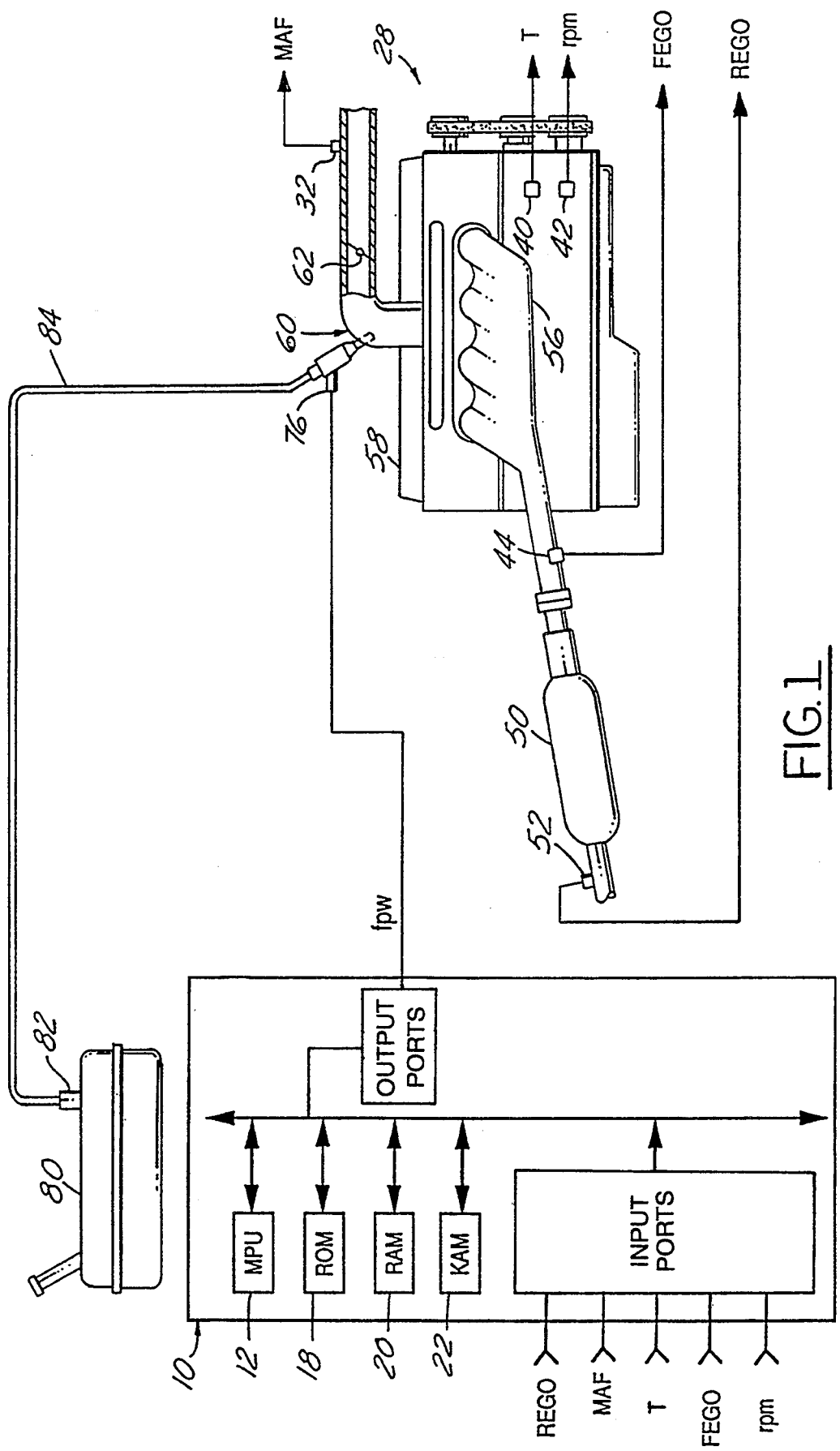
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18; random access memory 20; keep-alive memory 22; and a conventional data bus. Controller 10 is shown receiving various signals from sensors coupled to engine 28 including: measurement of inducted mass airflow (MAF) from mass airflow sensor 32; engine coolant temperature (T) from temperature sensor 40; indication of engine speed (rpm) from tachometer 42; output signal FEGO derived by conventional filtering and threshold comparison of the output from conventional exhaust gas oxygen sensor 44 positioned upstream of catalytic converter 50; and signal REGO derived by conventional filtering and threshold comparison of the output from another conventional exhaust gas oxygen sensor (52) positioned downstream of catalytic converter 52.

Intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Other engine components and systems such as an ignition system are not shown because they are well known to those skilled in the art. Although a central fuel injection system is shown, the invention claimed herein may be used to advantage with other types of systems such as sequential fuel injection or carbureted systems. Those skilled in the art will also recognize that the invention claimed herein is applicable to other engine control configurations such as "stereo" control systems wherein the fuel injectors for each bank are controlled by a separate exhaust gas oxygen sensor positioned in each of the exhaust manifolds in engines having a "V" configuration.

Figure 2:
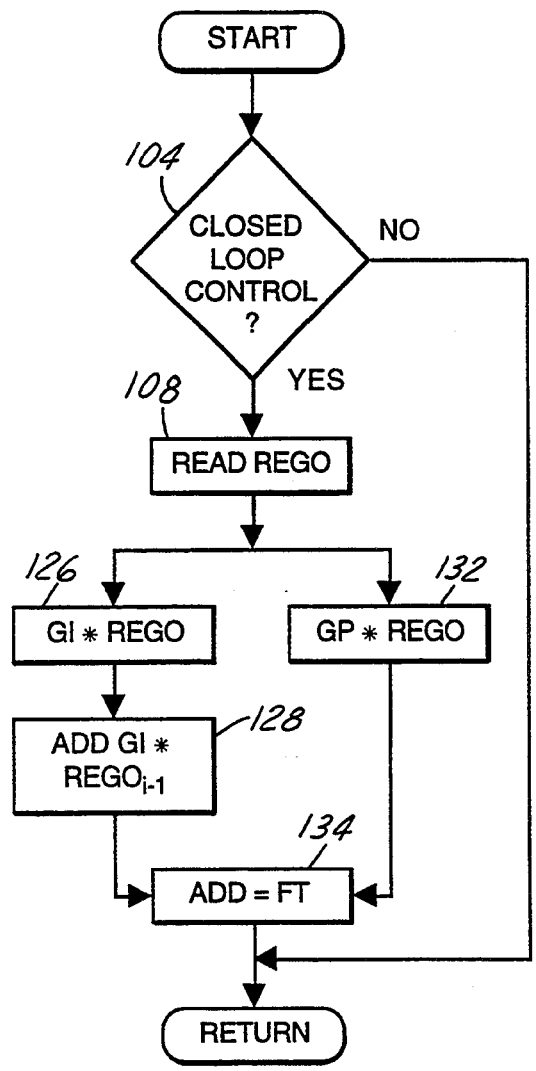
FIG. 2 is a high level flowchart of various operations performed by a portion of the embodiment shown in FIG. 1.

Referring now to FIG. 2, a flowchart of a routine performed by controller 10 to generate fuel trim signal FT is now described. In the particular example described herein, closed-loop air/fuel control is commenced (step 104) when engine temperature is within a predetermined range, the engine has been operating for at least a preselected time, and throttle position is within a preselected range. When closed-loop control commences, signal REGO is read (step 108), multiplied by gain constant GI (step 126), and the resulting product added to products previously accumulated (GI * $REGO_{i-1}$) in step 128. Stated another way, signal REGO is integrated each sample period (i) in steps determined by gain constant GI.

During step 132, signal REGO is multiplied by proportional gain GP. The integral value from step 128 is added to the proportional value from step 132 during addition step 134 to generate fuel trim signal FT.

Figure 3:
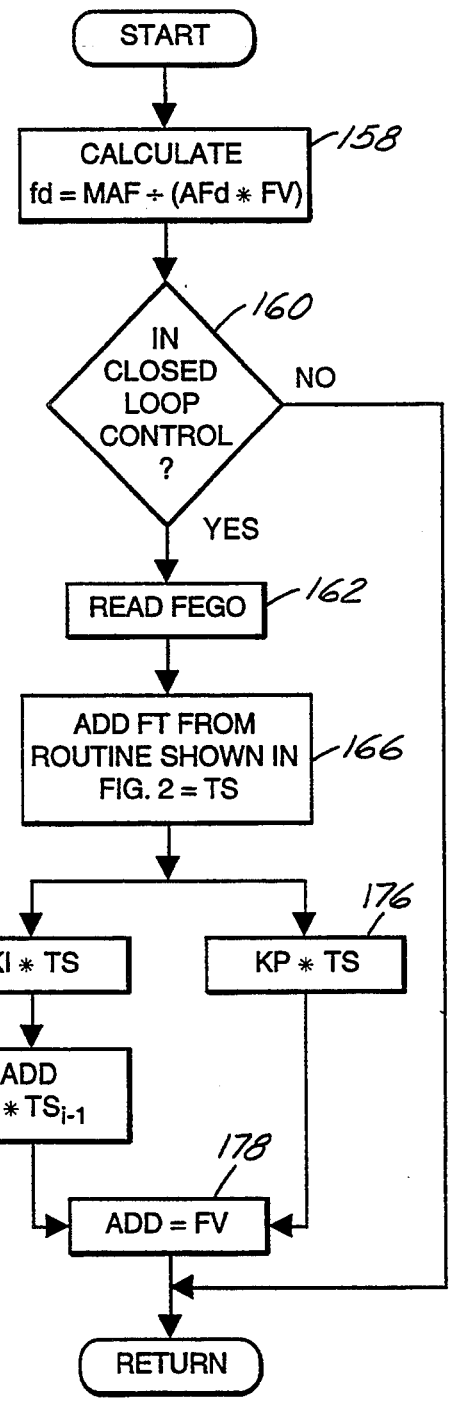
FIG. 3 is a high level flowchart of various operations performed by a portion of the embodiment shown in FIG. 1.

The routine executed by controller 10 to generate the desired quantity of liquid fuel delivered to engine 28 is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV which is generated as now described with respect to steps 160-178.

After determining that closed-loop control is desired (step 160), by monitoring engine operating conditions such as those previously described herein with reference to step 104 in FIG. 2, signal FEGO is read during step 162. Signal FEGO is then trimmed (in this example by addition) by trim signal FT which is transferred from the routine previously described with reference to FIG. 2 to generate trimmed signal TS. The product of integral gain value KI times trimmed signal TS (step 170) is generated and added to the previously accumulated products (step 172). That is, trimmed signal TS is integrated in steps determined by gain constant KI each sample period (i) during step 172. A product of proportional gain KP times trimmed signal TS (step 176) is then added to the integration of KI * TS during step 178 to generate feedback variable FV.

Alternatively, the process described above with particular reference to FIG. 3 may be performed by biasing-signal FV, rather than trimming signal FEGO, with fuel trim signal FT. In one such alternative embodiment, two proportional gain constants ($KP_1$ and $KP_2$) are used to advantage. Proportional gain $KP_1$ multiplies signal FEGO when it switches from a lean to a rich indicating state and proportional gain $KP_2$ multiplies signal FEGO when it switches from a rich to a lean state. Proportional term $KP_1$ is incremented when fuel trim signal FT indicates a lean bias is desired and proportional term $KP_1$ is decreased (or $KP_2$ incremented) when a rich bias is desired by fuel trim signal FT.

Figure 4A:
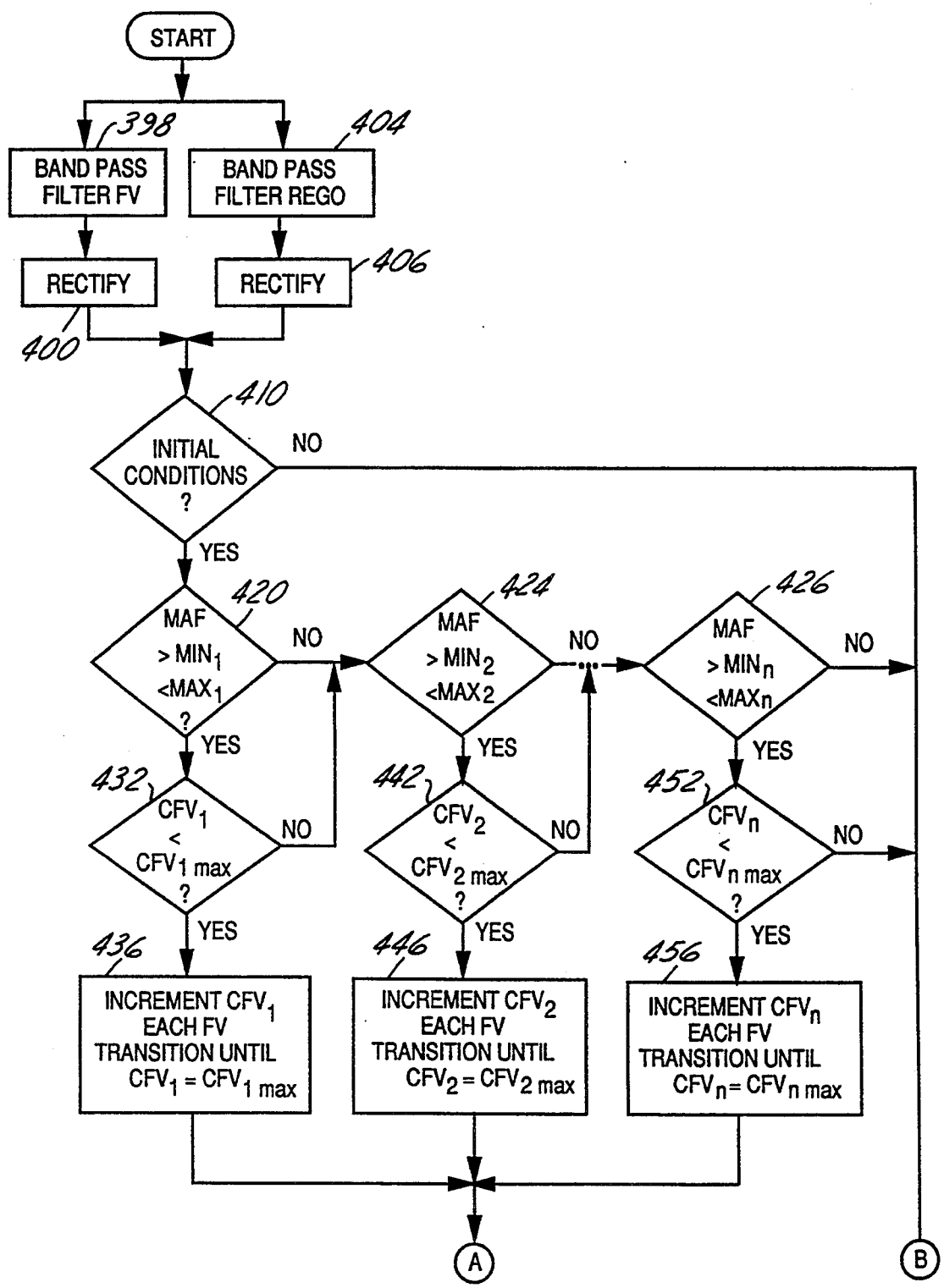
FIGS. 4A–4B are a high level flowchart of various operations performed by a portion of the embodiment shown in FIG. 1.
Figure 4B:
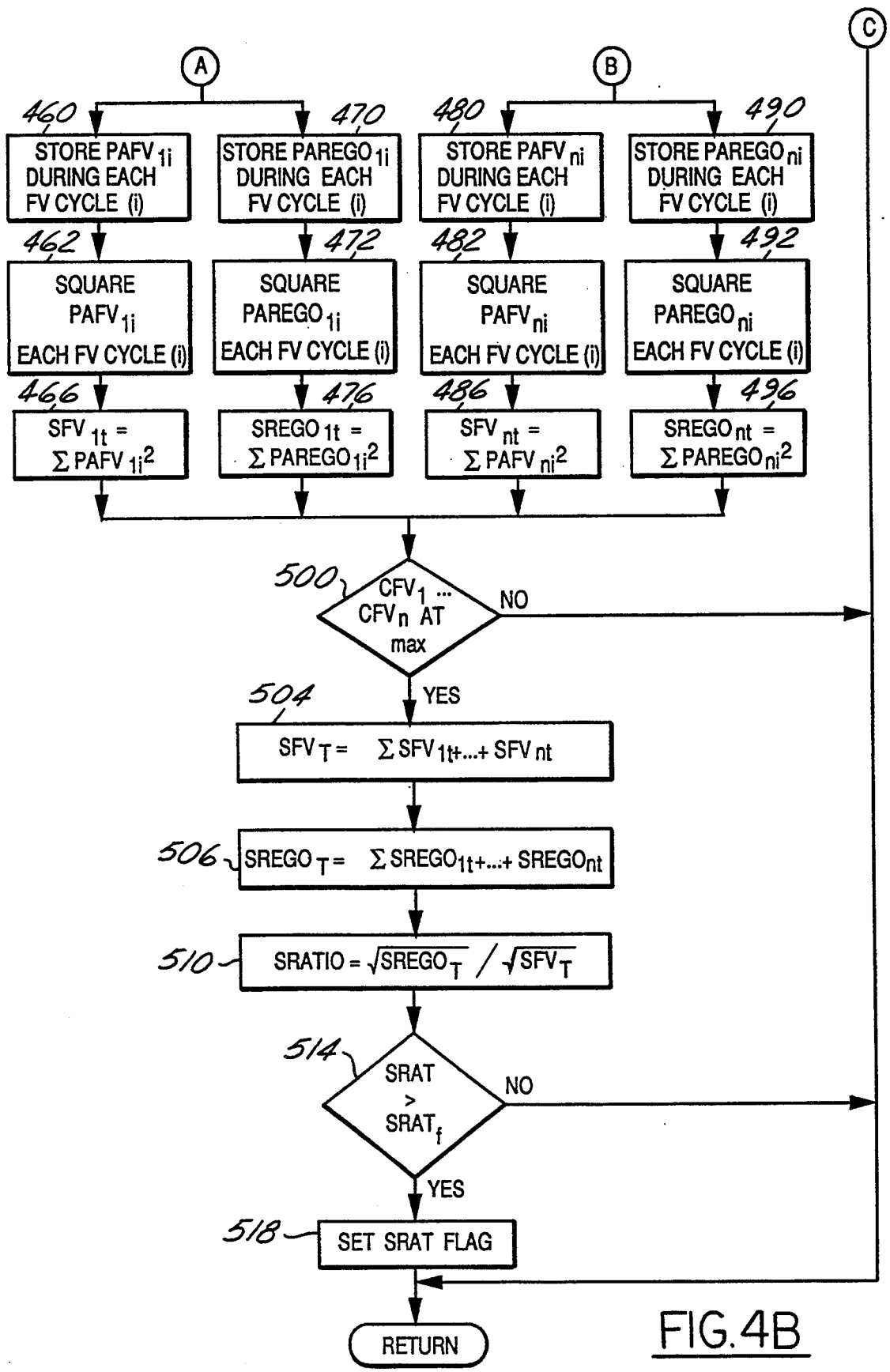
Figure 5A:
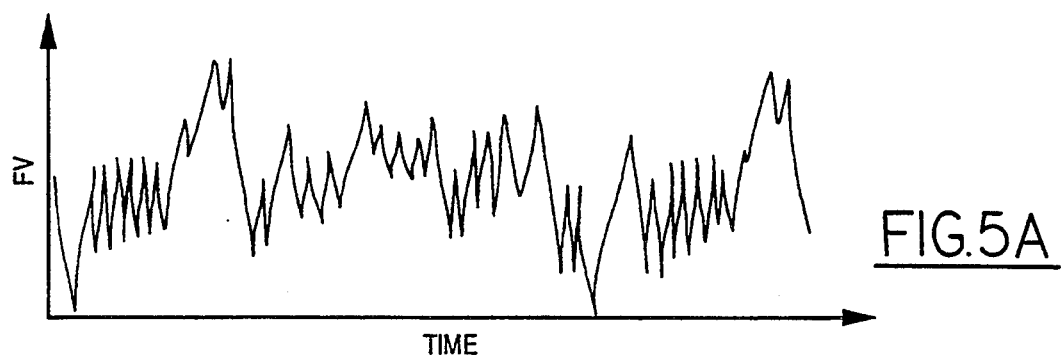
FIGS. 5A–5B are a graphical representation of various signals generated by a portion of the embodiment showing in FIG. 1.
Figure 5B:
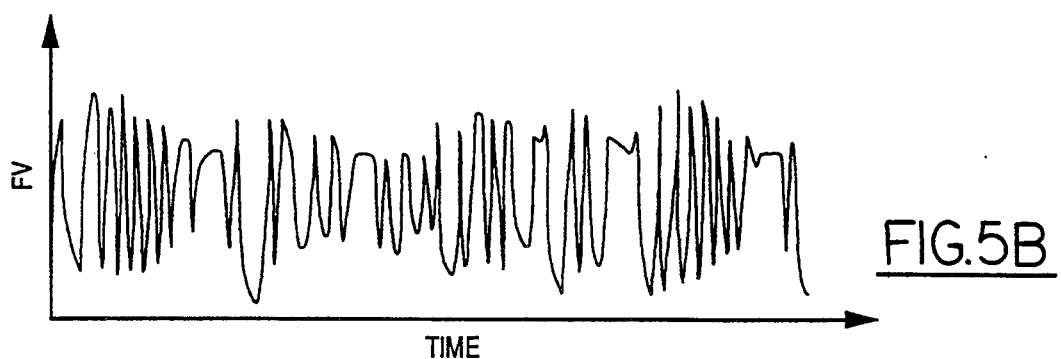
Figure 6A:
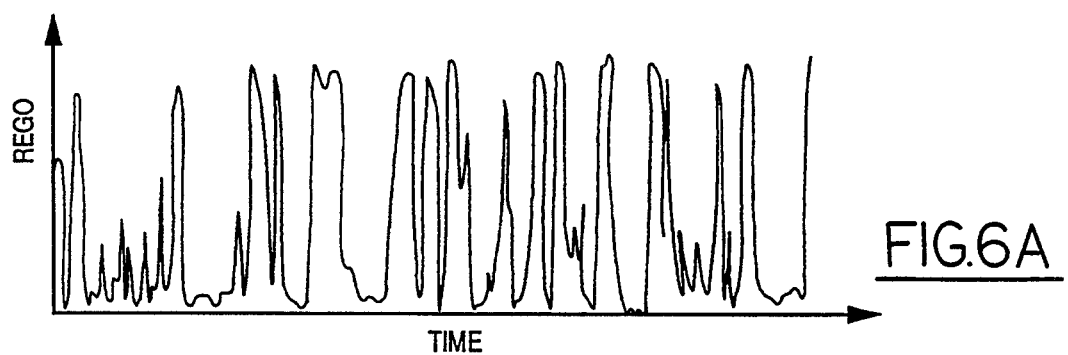
FIGS. 6A–6B are a graphical representation of various signals generated by a portion of the embodiment shown in FIG. 1.
Figure 6B:
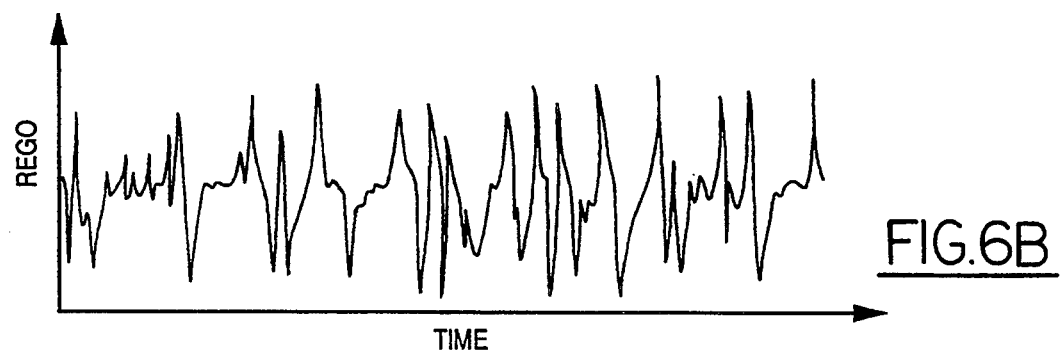

Referring now to FIGS. 4A-4B, signal FV is band pass filtered and then rectified during step 398 and step 400. Similarly, signal REGO is band pass filtered, and the filtered output rectified (steps 404 and 406). A hypothetical signal FV is shown in FIG. 5A and in FIG. 5B after it is band pass filtered. Similarly, signal REGO is shown in FIG. 6A and after band pass filtering in FIG. 6B. The band pass filtered outputs facilitate determination of peak amplitude as described below.

Returning to FIGS. 4A-4B, initial engine conditions are checked during step 410 before entering the test cycle or period which is now described. The inducted airflow range in which engine 28 is operating is determined during steps 420, 424, and 426. When engine 28 is operating within airflow range (1), the transition between states of signal FV are counted to generate count signal $CFV_1$. Count signal $CFV_1$ is incremented each transition of signal FV until it reaches its maximum count $CFV_{1max}$ (steps 432 and 436). The same procedure is followed when engine 28 is operating within airflow range (n) as shown in steps 426, 452, and 456. The test cycle or period is completed when engine 28 has operated in each of "n" airflow ranges during a preselected number of transitions in signal FV. A similar result may also be achieved by counting transitions in signal FEGO in place of transitions in signal FV.

While engine 28 is operating in airflow range (1), peak amplitude of signal FV during each FV cycle (i) is determined and stored as signal $PAFV_{1i}$ (step 460). Each signal $PAFV_{1i}$ is squared and stored for each FV cycle (i) as shown in step 462. During step 466 the summation of each square of signals $PAFV_{1i}$ over all FV cycles (i.e., $CFV_{1max}$) (i) is computed to generate signal $SFV_{1t}$.

Similar operations are performed on signal REGO during steps 470, 472 and 476 while engine 28 is operating in airflow range (1). More specifically, during step 470, the peak amplitude of signal REGO is determined and stored as signal $PAREGO_{1i}$ for each cycle (i) of signal FV. The square of signal $PAREGO_{1i}$ is then computed and stored in step 472 for each FV cycle (i). During step 476, the sum of each square of signal $PAREGO_{1i}$ is computed over all cycles of signal FV (i.e., $CFV_{1max}$) to generate signal $SREGO_{1t}$.

For the particular example presented herein, substantially the same operations are performed on signal FV during steps 480, 482, and 486 while engine 28 is operating in airflow range (n). Signal $SFV_{nt}$ is thereby generated which is the sum of the square of each peak amplitude of signal FV for each cycle (i) of signal FV.

Similarly, the operations performed on signal REGO during steps 490, 492, and 496 while engine 28 is operating in airflow range (n) are substantially the same as previously described with reference to engine operation in airflow range (1) and steps 470, 472 and 476. Signal $SREGO_{nt}$ is thereby generated in step 496 which is the summation of each square of each peak amplitude signal REGO over all cycles of signal FV while engine 28 is operating in airflow range (n).

The test period for testing converter efficiency is completed when the count in cycles or transitions of signal FV for each airflow range (1 ... n) reaches its respective maximum value ($CFV_{1max}$ ... $CFV_{nmax}$) as shown in step 500. After completion of the test period or cycle, the sum of each signal $SFV_t$ for each airflow range (i.e., $SFV_{1t}$ ... $SFV_{nt}$) is computed to generate signal $SFV_T$ in step 504. Similarly, the sum of each signal $SREGO_t$ for each airflow range (i.e., $SREGO_{1t}$ ... $SREGO_{nt}$) is calculated to generate total squared signal $SREGO_T$ in step 506.

During step 510, the ratio of the square root of signal $SREGO_t$ to the square root of signal $SFV_T$ is computed to generate signal SRATIO. When the previously computed ratio is greater than reference ratio $SRAT_f$ (step 514) a ratio flag is set in step 518 indicating degraded converter efficiency.

In accordance with the above described operation, computing a ratio based on the square root of the sum of the squares of peak amplitude, erroneous indications caused by asymmetrical variations in sensor output are avoided. Further, erroneous indications caused by sensor clipping is avoided by the above described operation.

An example of operation is presented wherein both upstream sensor 44 and downstream sensor 52 are two-state exhaust gas oxygen sensors. The invention claimed herein, however, may be used to advantage with other sensors such as proportional sensors. Other modifications will become apparent to those skilled in the art without departing from the spirit and scope of the invention. Accordingly, it is intended that the scope of the invention be defined only by the following claims.

What is claimed:

1. A method for controlling engine air/fuel ratio and concurrently monitoring efficiency of a catalytic converter positioned in the engine exhaust, comprising the steps of:
   generating a feedback variable by integrating an output of an upstream exhaust gas oxygen sensor positioned upstream of the catalytic converter and trimming said integration by a signal derived from an output of a downstream exhaust gas oxygen sensor positioned downstream of the catalytic converter, said feedback variable cycling above and below a nominal value;
   adjusting fuel delivered to the engine by said feedback variable;
   generating a first test signal related to peak amplitude of said feedback variable over a plurality of cycles of said feedback variable and generating a second test signal related to peak amplitude of said downstream sensor output over a plurality of cycles of said feedback variable; and
   indicating degraded converter efficiency when a ratio of said second test signal to said first test signal exceeds a predetermined ratio, said indicating step occurring upon completion of a test cycle generated when the engine has operated during a plurality of inducted airflow ranges each for a predetermined duration.

2. The method recited in claim 1 wherein said predetermined duration comprises a preselected number of cycles of said feedback variable.

3. The method recited in claim 1 wherein said first test signal generating step includes the steps of squaring said feedback variable peak amplitude each of said feedback variable cycles and summing said squares.

4. The method recited in claim 3 wherein said second test signal generating step includes squaring said downstream sensor output peak amplitude each of said feedback variable cycles and summing said squares.

5. The method recited in claim 4 wherein said first signal generating step includes the step of taking the square root of said squares.

6. The method recited in claim 5 wherein said second signal generating step includes the step of taking the square root of said squares.

7. A method for controlling engine air/fuel ratio and concurrently monitoring efficiency of a catalytic converter positioned in the engine exhaust, comprising the steps of:
   generating a feedback variable by integrating an output of an upstream exhaust gas oxygen sensor positioned upstream of the catalytic converter and trimming said integration by a signal derived from an output of a downstream exhaust gas oxygen sensor positioned downstream of the catalytic converter, said feedback variable cycling above and below a nominal value;
   adjusting fuel delivered to the engine by said feedback variable;
   determining and squaring both peak amplitude of said feedback variable and of said downstream exhaust gas oxygen sensor output during each cycle of said feedback variable;
   providing a test period;
   summing each of said squared peak amplitude downstream sensor outputs and summing each of said squared peak amplitude feedback variables over said test period to provide respective first and second sums; and
   indicating degraded converter efficiency when a ratio of a square root of said second sum to a square root of said first sum exceeds a reference ratio.

8. The method recited in claim 7 further comprising a step of providing said test period by determining when the engine has completed operation within each of the plurality of inducted airflow ranges for at least a minimum duration in each of said airflow ranges.

9. The method recited in claim 8 wherein said minimum duration is generated by counting a preselected number of cycles of said feedback variable.

10. A control system for controlling engine air/fuel ratio and concurrently monitoring efficiency of a catalytic converter positioned in the engine exhaust, comprising: control means for generating a feedback variable by integrating an output of an upstream exhaust gas oxygen sensor positioned upstream of the catalytic converter and trimming said integration by a signal derived from an output of a downstream exhaust gas oxygen sensor positioned downstream of the catalytic converter, said feedback variable cycling above and below a nominal value, said control means adjusting fuel delivered to the engine by said feedback variable;
   test means for generating a first test signal related to peak amplitude of said feedback variable over a plurality of cycles of said feedback variable and generating a second test signal related to peak amplitude of said downstream sensor output over said plurality of cycles of said feedback variable; and
   indicating means for indicating degraded converter efficiency when a ratio of said second test signal to said first test signal exceeds a predetermined ratio, said indicating means indicates converter efficiency upon completion of a test cycle generated when the engine has operated during a plurality of inducted airflow ranges each for a predetermined duration.

11. The system recited in claim 10 further comprising filter means for band pass filtering said feedback variable and said downstream sensor output.

* * * * *